United States Patent
Hutchinson De Staercke et al.

(10) Patent No.: US 9,421,748 B2
(45) Date of Patent: Aug. 23, 2016

(54) TIRE OPERATING SURFACE FOR TIRE TESTING ROAD WHEEL

(75) Inventors: Ann Hutchinson De Staercke, Greenville, SC (US); Samuel E. Hart, Jr., Travelers Rest, SC (US); Brooks M. Adams, Easley, SC (US)

(73) Assignees: Compagnie Generale Des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 203 days.

(21) Appl. No.: 14/369,452

(22) PCT Filed: Dec. 29, 2011

(86) PCT No.: PCT/US2011/067994
§ 371 (c)(1),
(2), (4) Date: Jun. 27, 2014

(87) PCT Pub. No.: WO2013/101134
PCT Pub. Date: Jul. 4, 2013

(65) Prior Publication Data
US 2014/0373999 A1    Dec. 25, 2014

(51) Int. Cl.
*B29C 65/48*        (2006.01)
*B32B 5/16*         (2006.01)
(Continued)

(52) U.S. Cl.
CPC .............. *B32B 37/16* (2013.01); *B29C 65/52* (2013.01); *B29C 65/525* (2013.01); *B32B 5/16* (2013.01);
(Continued)

(58) Field of Classification Search
CPC .... B29C 65/52; B29C 65/524; B29C 65/525; B32B 5/16; B32B 27/14; B32B 27/38; B32B 27/40; B32B 37/10; B32B 37/12; B32B 37/1253; B32B 37/24; B32B 38/1866; G01M 17/0074; G01M 17/022
See application file for complete search history.

(56) References Cited

U.S. PATENT DOCUMENTS

| 1,669,622 A | 5/1925 | Messer |
| 2,079,585 A | 5/1937 | Sloman |

(Continued)

FOREIGN PATENT DOCUMENTS

| CA | 2593751 A1 | 8/2006 |
| DE | 10141973 C1 | 4/2003 |

(Continued)

OTHER PUBLICATIONS

Neithalath et al; Using the Tire-Pavement Test Apparatus to Investigate the Influence of Time Geometry; paper 6, vol. 1, No. 1, 18 pgs, obtained from "http://www.concretepavements.org/IJCP/Vol%201%20No%201/Neithalath%20paper%206%20volume%201%20number%201.pdf".

(Continued)

Primary Examiner — Michael Tolin
(74) Attorney, Agent, or Firm — Hahn Loeser & Parks LLP; Bret A. Hrivnak

(57) ABSTRACT

Particular embodiments of the invention include a method of forming a tire operating surface for a road wheel. Such methods include: providing a longitudinally convex bonding surface for receiving a textured tire operating surface; applying adhesive material of a pre-determined thickness along the longitudinally convex bonding surface to form a coated bonding surface comprising a longitudinally convex layer of adhesive material arranged along the bonding surface; and, arranging a single layer of aggregate material along a retention surface. The methods also include placing a width of the longitudinally convex layer of adhesive material of the coated bonding surface into engagement with the single layer of aggregate and rotating the coated bonding surface in a lengthwise direction relative the retention surface until a length of the convex layer of adhesive material has engaged the single layer of aggregate.

20 Claims, 8 Drawing Sheets

(51) Int. Cl.

| | | |
|---|---|---|
| *B32B 27/14* | (2006.01) | |
| *B32B 37/10* | (2006.01) | |
| *B32B 37/24* | (2006.01) | |
| *G01M 17/02* | (2006.01) | |
| *B32B 37/16* | (2006.01) | |
| *B29C 65/52* | (2006.01) | |
| *B32B 27/38* | (2006.01) | |
| *B32B 27/40* | (2006.01) | |
| *B32B 37/12* | (2006.01) | |
| *G01M 17/007* | (2006.01) | |
| *B32B 38/18* | (2006.01) | |

(52) U.S. Cl.
CPC ............... *B32B 27/14* (2013.01); *B32B 27/38* (2013.01); *B32B 27/40* (2013.01); *B32B 37/10* (2013.01); *B32B 37/1284* (2013.01); *B32B 37/24* (2013.01); *G01M 17/0074* (2013.01); *G01M 17/022* (2013.01); *B32B 38/1866* (2013.01)

(56) References Cited

U.S. PATENT DOCUMENTS

| | | | |
|---|---|---|---|
| 2,098,306 | A | 11/1937 | Porter |
| 2,579,727 | A | 12/1951 | Carpenter |
| 2,598,599 | A | 5/1952 | Pleasance |
| 2,766,618 | A | 10/1956 | Stiehler et al. |
| 3,316,758 | A | 5/1967 | Wild |
| 4,718,759 | A | 1/1988 | Butler |
| 4,940,503 | A | 7/1990 | Lindgren et al. |
| 5,111,687 | A | 5/1992 | Hill |
| 5,504,968 | A | 4/1996 | Pressley |
| 5,703,284 | A | 12/1997 | Gerhards et al. |
| 6,382,020 | B1 | 5/2002 | Fischer et al. |
| 6,439,041 | B1 | 8/2002 | Stalnaker et al. |
| 6,510,733 | B2 | 1/2003 | Coe et al. |
| 7,168,307 | B2 | 1/2007 | Jahn et al. |
| 8,196,462 | B2 | 6/2012 | Stalnaker et al. |
| 2002/0071957 | A1 | 6/2002 | Squitieri |
| 2003/0094120 | A1 | 5/2003 | Golley et al. |
| 2004/0163455 | A1 | 8/2004 | Deniau |
| 2007/0086861 | A1 | 4/2007 | Pratt |
| 2007/0240614 | A1 | 10/2007 | Lynch |
| 2009/0012763 | A1 | 1/2009 | Langer et al. |
| 2010/0258014 | A1 | 10/2010 | Van Heijningen |
| 2011/0000292 | A1 | 1/2011 | Yoshikawa et al. |
| 2012/0186324 | A1 | 7/2012 | Neugebauer et al. |

FOREIGN PATENT DOCUMENTS

| | | | |
|---|---|---|---|
| GB | 326651 | A | 3/1930 |
| GB | 1375312 | | 11/1974 |
| GB | 2264503 | A | 9/1993 |
| JP | 58166240 | A | 10/1983 |
| JP | 3044532 | A | 2/1991 |
| JP | 04181142 | A | 6/1992 |
| JP | 6129954 | A | 5/1994 |
| JP | 03706637 | B2 | 9/1994 |
| JP | 7020030 | A | 1/1995 |
| JP | H0720029 | A | 1/1995 |
| JP | 7146217 | A | 6/1995 |
| JP | 8233716 | A | 9/1996 |
| JP | 10331391 | A | 12/1998 |
| JP | 11-044593 | A * | 2/1999 |
| JP | 11218470 | A | 8/1999 |
| JP | 2006226695 | A | 8/2006 |
| JP | 2007017423 | A | 1/2007 |
| JP | 04070288 | B2 | 4/2008 |
| JP | 2008082709 | A | 4/2008 |
| JP | 2008134080 | A | 6/2008 |
| JP | 04169673 | B2 | 10/2008 |
| JP | 2009122027 | A | 6/2009 |
| JP | 04343791 | B2 | 10/2009 |
| JP | 04371940 | B2 | 11/2009 |
| JP | 4496054 | B2 | 7/2010 |
| JP | 04559617 | B2 | 10/2010 |
| JP | 04915139 | B2 | 4/2012 |
| KR | 78366081 | | 12/2007 |
| WO | 2005116638 | A1 | 12/2005 |
| WO | 2012003314 | A1 | 1/2012 |
| WO | 2013102148 | A1 | 7/2013 |

OTHER PUBLICATIONS

Emil Venere; Machine harnesses sound science to probe causes of road noise, Mar. 25, 2003, 5 pgs, obtained from http://www.purdue.edu/uns/html3month/030325.Bernhard.tiremach.html.
PCT/US2011/067994 International Search Report and Written Opinion, May 2, 2012.

* cited by examiner

US 9,421,748 B2

TIRE OPERATING SURFACE FOR TIRE TESTING ROAD WHEEL

This application is a National Stage application of International Application No. PCT/US2011/067994, filed Dec. 29, 2011.

BACKGROUND OF THE INVENTION

This invention relates generally to road wheels for tire testing machines and more specifically, tire operating surfaces for road wheels used for tire testing machines and methods of forming the same.

DESCRIPTION OF THE RELATED ART

Tires are often tested to determine any of a variety of characteristics. In particular instances, in lieu of testing tires on a vehicle under normal operating conditions, tires are tested on a rotating road wheel.

In operation, the tire rotates along a radially outer annular surface of the rotating road wheel. In particular instances, the radially outer annular surface is texturized. The textured surface typically includes an abrasive adhesively attached to an outer, annular surface of the road wheel. The abrasive generally comprises silica or another silica-like product unrelated to the surface upon which a tire normally operates during vehicle operating conditions. Typically, however, vehicles operate on road surfaces comprised of different material, such as concrete, asphalt, brick, stone, and/or surfaces containing aggregate or the like. Unfortunately, the texturized radially outer annular tire operating surfaces of road wheels are not formed of any of the materials forming real-world tire operating surfaces.

Therefore, there is a need to provide a road wheel having a tire operating surface formed of material representing a surface upon which a tire operates during real-world vehicle operation.

SUMMARY OF THE INVENTION

Particular embodiments of the invention include a method of forming a tire operating surface for a road wheel. Such methods include the step of providing a longitudinally convex bonding surface for receiving a textured tire operating surface, the bonding surface being associated with a radially outer side of a rotatable road wheel and having a width and a convex length extending along an arcuate path. The methods further include the step of applying adhesive material of a pre-determined thickness along the longitudinally convex bonding surface to form a coated bonding surface comprising a longitudinally convex layer of adhesive material arranged along the bonding surface and arranging a single layer of aggregate material along a retention surface. The methods also include the step of placing a width of the longitudinally convex layer of adhesive material of the coated bonding surface into engagement with the single layer of aggregate. The methods also include the step of rotating the coated bonding surface in a lengthwise direction relative the retention surface until a length of the convex layer of adhesive material has engaged the single layer of aggregate, whereby the engaged aggregate remains affixed to the adhesive layer subsequent rotation to effectively transfer the engaged aggregate from the retention surface to the coated bonding surface to coat the adhesive layer with aggregate and thereby affixing the single layer of aggregate along the bonding surface to form a tire operating surface along the bonding surface.

The foregoing and other objects, features and advantages of the invention will be apparent from the following more detailed descriptions of particular embodiments of the invention, as illustrated in the accompanying drawings wherein like reference numbers represent like parts of the invention.

DETAILED DESCRIPTION OF PARTICULAR EMBODIMENTS

Figure 1:
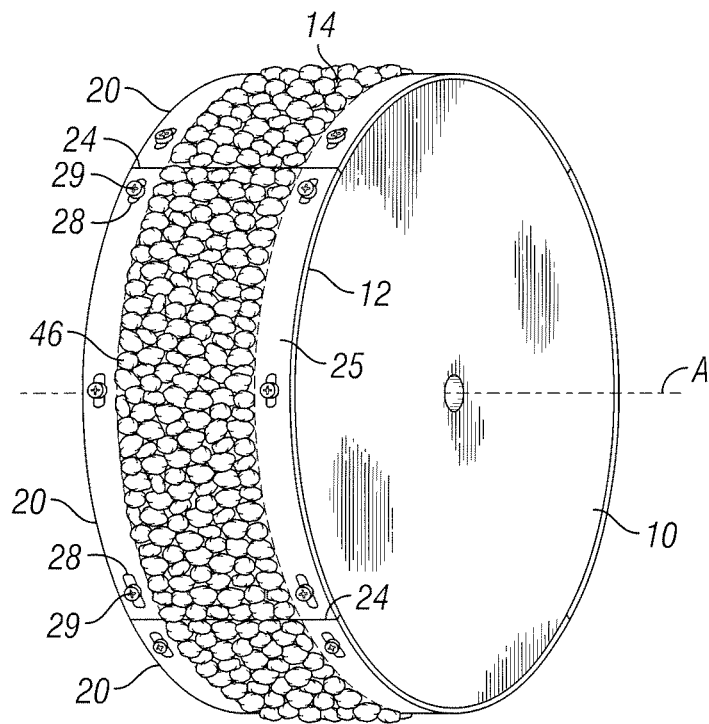
FIG. 1 is a perspective view of a road wheel for use in tire testing, the road wheel having an external annular side including an annular tire operating surface comprising a plurality of arcuate tire operating surface segments coated with aggregate in accordance with a particular embodiment of the invention.

As suggested above, there is a need to provide an improved road wheel for performing tire testing operations. And because there is a desire to test a tire under normal operating conditions, or conditions that more closely resemble real-world tire operating conditions, there is a desire to form the exterior tire operating surface from a material forming or resembling the surface upon which the tire operates during real-world vehicle operation. Such real-world operating surfaces may comprise an arrangement of aggregates or constituents such as stone, rock, brick, and/or other materials.

Accordingly, particular embodiments of the present invention comprise methods of forming an annular tire operating surface along a radially outer side of a rotatable road wheel, the tire operating surface comprising a plurality of aggregates upon which a tire will operate. The plurality of aggregates may form, or represent those that form, any desired real-world tire operating surface. Other embodiments comprise methods of forming a road wheel, a road wheel formed by such methods, and a system for forming the road wheel in accordance with the methods discussed herein. The following will now discuss various methods of forming an annular tire operating surface along a radially outer side of a rotatable road wheel, and methods of forming a road wheel.

Particular embodiments of such methods include a step of providing a longitudinally convex bonding surface for receiving a tire operating surface formed of aggregate, the bonding surface being associated with a radially outer side of a rotatable road wheel and having a width and a convex length extending along an arcuate path. A road wheel for testing tires generally includes a radial outer side extending lengthwise annularly about an outer circumference of the road wheel. Tire testing along the road wheel is accomplished by rolling a tire along a tire operating surface extending lengthwise about the radial outer side. Therefore, the radial outer side as well as the tire operating surface can generally be described as being longitudinally convex, where each extend lengthwise about the road wheel radial outer side.

A bonding surface is arranged about the radial outer side of the road wheel for receiving the tire operating surface. The bonding surface may form a portion of the road wheel or may be formed separately for operable attachment to the road wheel. The length of the bonding surface extends in the circumferential direction, which forms an arcuate path. The arcuate path is generally defined by a radius of curvature. The radius of curvature may or may not have an origin located along a rotational axis of the road wheel.

The width of the bonding surface generally extends laterally in a direction perpendicular to the lengthwise direction of the bonding surface. It is understood that the width of the bonding surface may extend laterally along any desired path, which may be linear or non-linear. For example, the width of the bonding surface may extend linearly in a direction parallel to the rotational axis of the road wheel, or may extend non-linearly, such as along a convex or concave path. It is also understood that the width of the bonding surface may be constant or variable.

Figure 2:
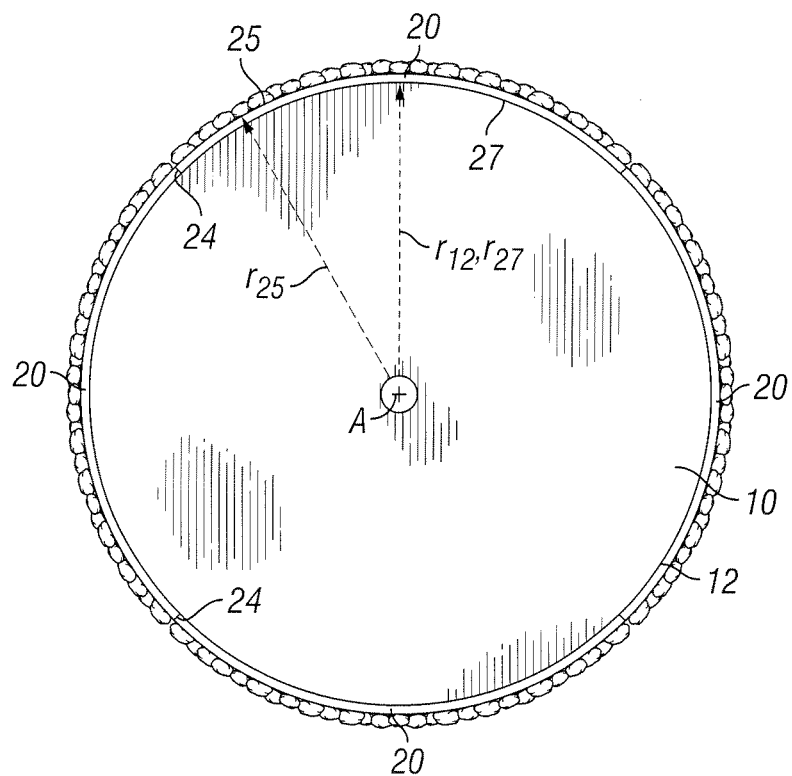
FIG. 2 is a side elevational view of the road wheel of FIG. 1.
Figure 3:
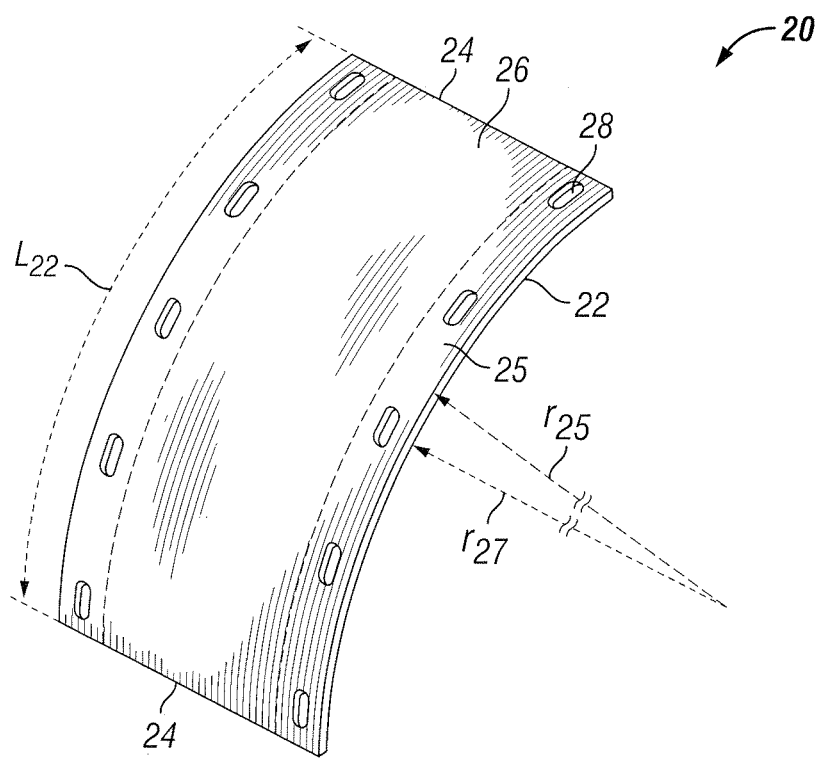
FIG. 3 is a top perspective view of a base member forming an arcuate segment for use in forming an arcuate ring segment of FIG. 1, the base member formed of a sheet of rigid material having an arcuate length to form a longitudinally convex outer side and bonding surface in accordance with a particular embodiment of the invention.

With reference now to FIGS. 1-3, an exemplary embodiment of a road wheel 10 is shown formed in accordance with particular embodiments of the methods disclosed herein. The road wheel includes an external, radially outer tire operating surface 14 extending annularly about a radially outer side 12 of the road wheel. The road wheel is generally cylindrical in shape, and is rotatable along rotational axis A-A. The external annular tire operating surface 14 includes a plurality of aggregates 46 (i.e., tire operating surface constituents) arranged along a bonding surface 25. The radially outer side 12, as well as the bonding surface 25, is shown to be longitudinally convex in a circumferential direction, as it is associated with a radially outer surface of a cylinder. Accordingly, with specific reference to FIGS. 2 and 3, the bonding surface 25 is shown to generally extend in an arcuate path defined by radius of curvature $r_{25}$, whose origin is the rotational axis of the road wheel A-A. The width of the bonding surface is shown to extend laterally along a linear path parallel to the rotational axis of the road wheel. It is understood that the bonding surface may be smooth or may be texturized to increase the bonding characteristics of the surface. For example, the surface may be roughened using an abrading tool, such as a grinding disk or a sand blaster, or any chemical, such as for surface etching.

In particular embodiments, the longitudinally convex bonding surface is arranged along a radial outer surface of an arcuate base member. Because the bonding surface may form a removable portion or a fixed, non-removable portion of the road wheel, the base member itself may comprise a removable or a fixed, non-removable portion of the road wheel. It is also understood that the base member may comprise one of a plurality of segments for arrangement along the radial outer side of the road wheel. The base member may be attached to the road wheel according to any known method using any known mechanism or mechanisms. For example, segments may be attached using fasteners, clips, or the like, mechanical interference, by using one or more magnets, or by welding.

With reference to FIGS. 1-3, in particular embodiments, the radially outer side 12 of the exemplary road wheel comprises a plurality of segments 20 upon which a tire operating surface 14 is formed. Each segment comprises a base member 22 having a length $L_{22}$ extending between terminal ends 24. Base member 22 has a thickness extending radially between a longitudinally concave inner side 27 and a longitudinally convex outer side 25 comprising a bonding surface such that the base member forms a tire operating surface segment when the adhesive layer is coated with aggregate. The terminal ends are shown to extend linearly in a lateral direction perpendicular to the longitudinal direction of the base member or the circumferential direction of the road wheel (that is, in other words, in a direction parallel to the rotational axis of the road wheel). It is understood that any terminal end 24, in other variations, may extend laterally along a linear or non-linear path in a direction biased to the length of the base member or the circumferential direction of the road wheel. Such a biased terminal end may provide a more uniform splice or joint between adjacent segments 20, which may also reduce any rotational imbalances or vibrations that may otherwise arise as the road wheel rotates. In the embodiment shown, the segments are configured to be selectively removable to allow different tire operating surfaces to be installed upon the road wheel as desired for different tire tests. In other words, the segments are interchangeable. Although any means may be employed for attaching each base member 20 to the road wheel 10, the base member in the embodiment shown includes a plurality of apertures 28 to facilitate such attachment, such as by use of fasteners 29 or the like. With reference to FIGS. 1 and 3, apertures 28 may be slotted to provide an easier, more forgiving means of installation to accommodate any manufacturing tolerances, such as when aligning the aperture with the fastener-receiving aperture in the road wheel. Of course, the aperture may comprise any other desired shape, which includes forming a circular opening.

Figure 12A:
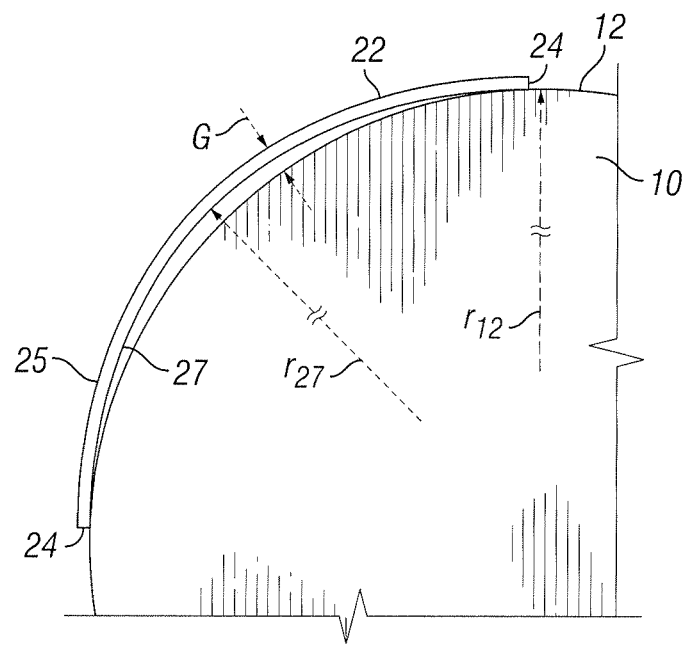
FIG. 12A is a side view of a base member comprising a segment attached to an outer side or perimeter of a road wheel, the radius of curvature of the base member being less than the radius of curvature of the outer side or perimeter of the road wheel.
Figure 12B:
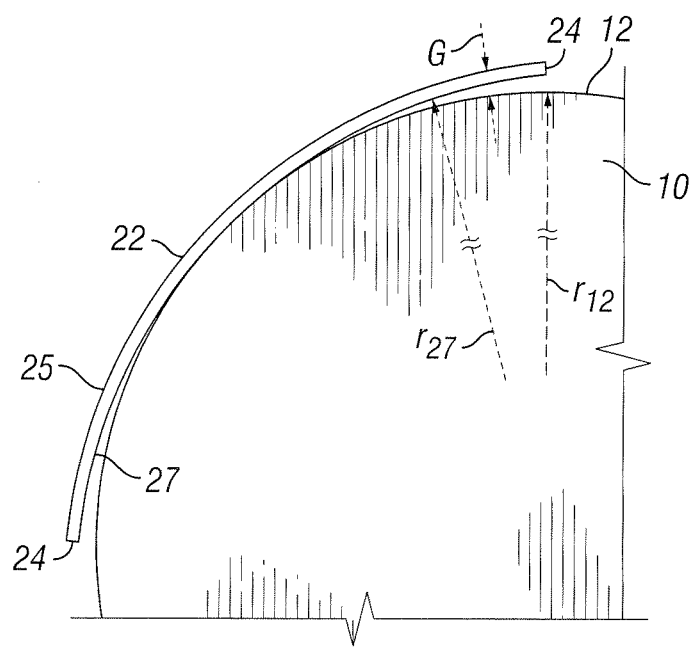
FIG. 12B is a side view of a base member comprising a segment attached to an outer side or perimeter of a road wheel, the radius of curvature of the base member being less than the radius of curvature of the outer side or perimeter of the road.

With specific reference to embodiments of FIGS. 2-3, each base member 22 extends longitudinally along an arcuate path having a radius of curvature defined by radius $r_{27}$, which is shown to extend from a concave inner or back side 27 of the base member. In the embodiment shown, radius $r_{27}$ is equal to a radius $r_{12}$ defining the radius of curvature of an outer, arcuate surface or perimeter 12 of road wheel. However, due to manufacturing tolerances, radius $r_{27}$ may deviate from radius $r_{12}$. In doing so, one or more gaps may arise between the road wheel 10 and the base member 20 when installed upon the road wheel. For example, with reference to FIG. 12A, a gap G is located centrally along the length of the base member 22 (or segment 20), where radius $r_{27}$ is less than radius $r_{12}$. By further example, with reference to FIG. 12B, a gap G is located adjacent one or both terminal ends 24 of the base member 22, where radius $r_{27}$ is greater than radius $r_{12}$. Because the gap may cause the base member and the adhesive layer to deflect as the tire rolls along the road wheel, the bond between the adhesive and any aggregate may separate or fracture. This, however, depends upon the flexibility of the material forming the base member and the adhesive layer. For example, larger gaps may be tolerated if such materials are sufficiently flexible, while smaller gaps may only be tolerated when the materials are more rigid. In particular embodiments, when using an approximately 8.9 mm thick adhesive layer formed of Latapoxy® (discussed further below), a gap may be sufficiently tolerated that occurs when the ratio of radius of curvature $r_{27}$ divided by radius of curvature $r_{12}$ (that is, $r_{27}/r_{12}$) is equal to or greater than 0.93 and equal to or less than 1.07 (that is, $0.93 \leq r_{27}/r_{12} \geq 1.07$). In other words, radius $r_{27}$ is equal to or within 7% of radius $r_{12}$. Other ratios or differences may be employed when using different materials, such as polyurethanes, which may be more flexible than Latapoxy®.

It is understood that the base member may be formed of any structure or material suitable for its intended purpose. For example, each may comprise a sheet of metal or metal alloy rolled or bent using any known means for bending sheets, such as a press or roller. By further example, each base member may be molded to a desired shape using any moldable material, such as any plastic, metal, or metal alloy. For a longitudinally convex base member, its thickness extends radially between a longitudinally concave inner side and a longitudinally convex outer side.

Particular embodiments of such methods may further include the step of applying adhesive material of a pre-determined thickness along the longitudinally convex bonding surface to form a coated bonding surface comprising a longitudinally convex layer of adhesive material arranged along the bonding surface. To bond aggregate to the bonding surface, an adhesive is applied to the bonding surface prior to receiving the aggregate. The adhesive material is applied to achieve a pre-determined thickness sufficient to capture and retain the aggregate. In other words, the thickness of the adhesive layer may be selected to accommodate the size and shape of the aggregate. For example, an adhesive layer thickness of 8.9 millimeters (mm) has been employed to retain aggregate having a height, width, and/or depth of 6 millimeters (mm) to 10 mm. The pre-determined thickness may also be selected such that the adhesive does not substantially flow through the aggregate to form at least a portion of the tire operating surface. For example, if the aggregate is sufficiently wide, less aggregates may be used to coat the adhesive layer, and therefore, less adhesive may be squeezed through the layer when the aggregate is forcefully applied. The adhesive material may also applied along the bonding surface in any location to achieve a predetermined placement of the aggregate. For example, the adhesive layer may extend continuously or discontinuously to form a corresponding continuous or discontinuous tire operating surface along the road wheel.

The adhesive material may comprise any composition sufficient to retain any aggregate along the bonding surface as the corresponding road wheel rotates during operation. The adhesive may also be selected to maintain the bond under any desired tire testing conditions. This may include being capable of maintaining its bond with the aggregate during high and low temperature conditions. Exemplary adhesives include epoxy resins and polyurethanes. One exemplary adhesive is an epoxy made commercially available by Laticrete International, Inc. and marketed as a stone adhesive having the trade name of Latapoxy®. The physical properties of Latapoxy® include: a shear bond strength between marble and concrete of 730-920 pounds per square inch (psi) or 5-6.3 MPa as tested according to ANSI A118.3-5.5; a compressive strength of 8300-8450 psi (57-58 MPa) as tested according to ANSI A118.3-5.6; and a tensile strength of 1500-2100 psi (10.3-14.5 MPa) as tested according to ANSI A118.3-5.7. The working properties of Latapoxy® have been found to provide a consistency having no sag in thickness to 1 inch (25 mm), a pot life at 72 degrees Fahrenheit (° F.) or 20 degrees Celsius (° C.) of 30-45 minutes, and a set time at 72° F. (20° C.) 5-6 hours.

The adhesive may also be selected such that the adhesive layer sufficiently holds its form, at least temporarily for a short duration, during the steps of engaging the aggregates and relatively rotating the adhesive layer along the aggregate layer. For example, the adhesive layer should not only be sufficiently viscous to deform and receive aggregate within its thickness, the adhesive should not be overly fluid to overly deform or flow from the bonding surface when exposed to compressive forces during the step of engaging. Further, the adhesive layer should resist significantly losing its form when being handled or when being inverted elevationally during the steps of engaging and rotating. To provide any such adhesive, an adhesive may be selected having a predetermined viscosity. Further, the adhesive may be selected to have a desired viscosity at any temperature under which the adhesive is applied and the aggregate arranged therein, such as in the steps of engaging and rotating. To achieve any desired viscosity, the adhesive may be partially set or cured prior to receiving any aggregate.

Adhesive may be applied to the bonding surface by any known means for applying adhesive, which may be manual or automatic. For example, the adhesive may be applied using a hand tool, such as a brush or a putty knife or the like. The adhesive may also be poured or extruded onto the bonding surface, or may be deposited thereon by any other means. As stated above, the adhesive is applied to form an adhesive layer having a pre-determined thickness. The thickness of the adhesive layer may be constant or variable. In particular embodiments, the adhesive layer is longitudinally convex, meaning that an exposed radially outer surface of the adhesive layer is longitudinally convex. For example, this longitudinally convex adhesive layer may be formed by applying a constant or variable thickness layer to a longitudinally convex bonding surface. Once the adhesive layer is arranged on the bonding surface with the aggregate attached thereto, the adhesive may set or become cured so to secure the aggregate therein. Such an adhesive may set over time with exposure to ambient or heated conditions. While the adhesive may fully cure prior to installation of the coated bonding surface upon the road wheel, in particular embodiments the adhesive fully cures after the coated bonding surface is installed upon the road wheel, such as when it is desirous to rearrange any aggregate after such installation.

Particular embodiments of the step of applying adhesive material of a pre-determined thickness along the longitudinally convex bonding surface or base member includes arranging a pair of adhesive guide members along a length of the bonding surface. In particular embodiments the adhesive guide members have an arcuate length and are spaced apart laterally across a width of the bonding surface to provide an area for receiving the adhesive material and forming the tire operating surface. The adhesive guide members extend lengthwise in an arcuate path at least when installed upon the bonding surface or base member. This means that the arcuate adhesive guide members may be arcuate prior to installation or upon installation, such as when the adhesive guide members are sufficiently flexible to bend into the installed configuration.

It follows that when employing adhesive guide members, more than one pair may be employed. For example, a plurality of adhesive guide members may be arranged one or both opposing lateral sides to form a plurality of opposing pairs of adhesive guide members. Adhesive guide members arranged on any lateral side may be arranged end-to-end such that the adhesive guide members extend continuously along the adhesive-receiving area. In other variations, the adhesive guide members may be spaced to extend discontinuously, such as when the adhesive layer extends discontinuously along its length.

The lateral spacing of opposing adhesive guide members may be selected to control the width of the adhesive layer during its formation, whereby the adhesive guide members are be spaced laterally a distance equal to or greater than the desired width of the adhesive layer. Further, the adhesive guide members may also be used to control thickness of the adhesive layer formed atop the bonding surface. Accordingly, each adhesive guide member is arranged to extend radially outward relative the bonding surface by a height, the height extending a distance between the bonding surface and a top of the adhesive guide member. This distance is selected to achieve a desired thickness of the adhesive layer formed on the bonding surface, which may be constant or variable.

Therefore, in particular embodiments, the step of applying adhesive along the bonding surface includes applying adhesive material between the pair of laterally spaced adhesive guide members to form an adhesive layer having a desired thickness, where the height by which the adhesive guide members extend above the bonding surface is at least equal to the pre-determined thickness of the adhesive layer. Accordingly, the thickness of the adhesive layer may be such that an exposed radially outer side or surface (that is, a top side or surface) of the adhesive layer is elevationally or radially aligned with the top of the adhesive guide members, whereby the pre-determined thickness of the adhesive layer is equal to or less than the height by which the adhesive guide members extend from the base member.

To facilitate formation of an adhesive layer having a desired thickness, the step of applying adhesive material of a pre-determined thickness along the longitudinally convex bonding surface further includes arranging an adhesive leveling member laterally across the bonding surface and atop the pair of adhesive guide members to control the formation of the adhesive layer thickness. In particular embodiments, the leveling member comprises a longitudinal member extending laterally across the width of the adhesive layer and between a pair of laterally opposite adhesive guide members, whereby the leveling member translates in a lengthwise direction of the bonding surface or adhesive layer atop the adhesive guide members to shape the adhesive layer. In other embodiments, the leveling member may form the adhesive layer thickness by pressing against the adhesive layer in a radially inward direction. For example, in such instances, the leveling member comprises a molding operation to form or shape the adhesive as desired to achieve an adhesive layer having any desired thickness. In any embodiment, the leveling member includes a leveling surface or edge that is arranged adjacent the top of the adhesive layer. The leveling surface or edge may be elevationally aligned with the top of the adhesive guide members, or may extend radially inward from the top of the adhesive guide members such that the leveling surface or edge is recessed radially inward, or below, the top of the adhesive guide members. Accordingly, the leveling surface or edge of the leveling member may be arranged in any manner relative the adhesive guide members or the bonding surface to achieve an adhesive layer of any desired thickness.

It is understood that the leveling surface or edge may extend longitudinally in a lateral direction relative the bonding surface along any desired linear or non-linear path. As such, the leveling surface or edge may be shaped as desired to form an adhesive layer having any desired constant or variable thickness. Accordingly, the adhesive layer may have any desired shape or profile. For example, the leveling surface or edge may extend longitudinally along an arcuate path. The arcuate path, for example, may be concave to form a laterally convex adhesive layer along a bonding surface. The laterally convex adhesive layer may have a constant or variable thickness extending laterally. It is understood that the laterally convex adhesive layer may be formed on a similarly shaped laterally convex bonding surface or on a laterally linear or flat bonding surface. By further example, the leveling surface or edge of the leveling member may extend along a non-linear path forming a plurality of recesses and extensions to form an adhesive layer having a top surface including corresponding recesses formed therein. In such instances, the recesses may be provided to improve the ability of the adhesive layer to conform to the aggregate being applied thereto and/or to reduce the amount of adhesive material that may penetrate through the aggregate to reside along the final tire operating surface.

Figure 4:
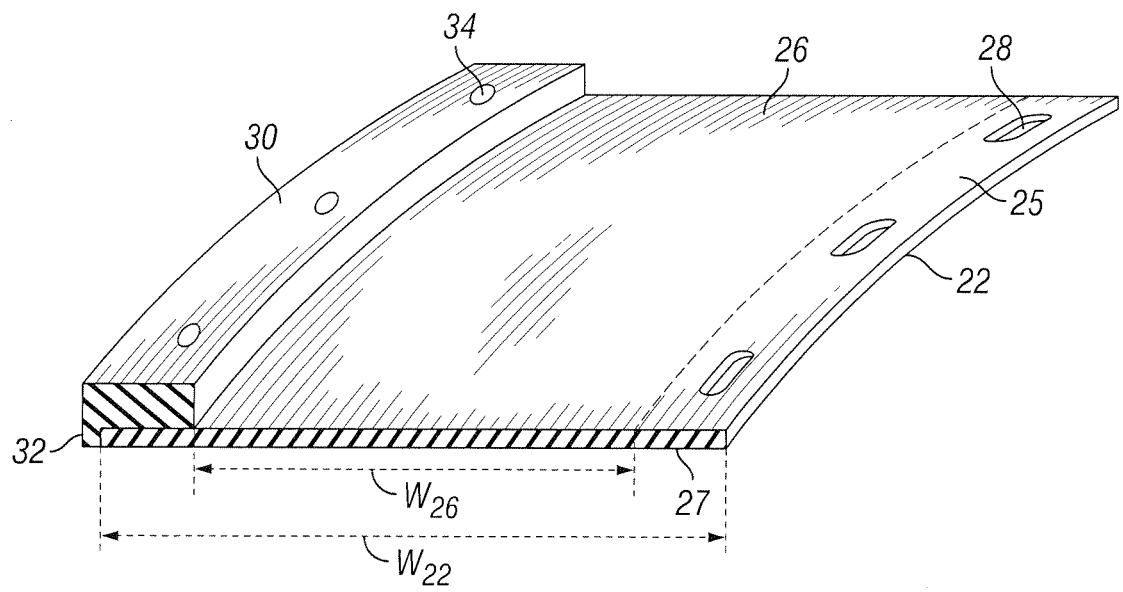
FIG. 4 is a front perspective view of the base member of FIG. 3 showing one of a pair of adhesive guide members arranged along one lateral side of the base member in preparation for receiving adhesive material along a radially outer side of the base member between a pair of adhesive guide members in accordance with a particular embodiment of the invention.
Figure 5A:
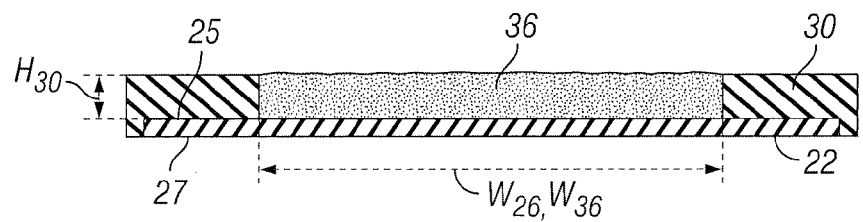
FIG. 5A is an end elevational view of the arcuate segment base member of FIG. 3 showing an adhesive material arranged along an outer side of the base member between a pair of adhesive guide members spaced laterally across a width of the base member and extending longitudinally along a length of the base member in accordance with a particular embodiment of the invention.
Figure 5B:
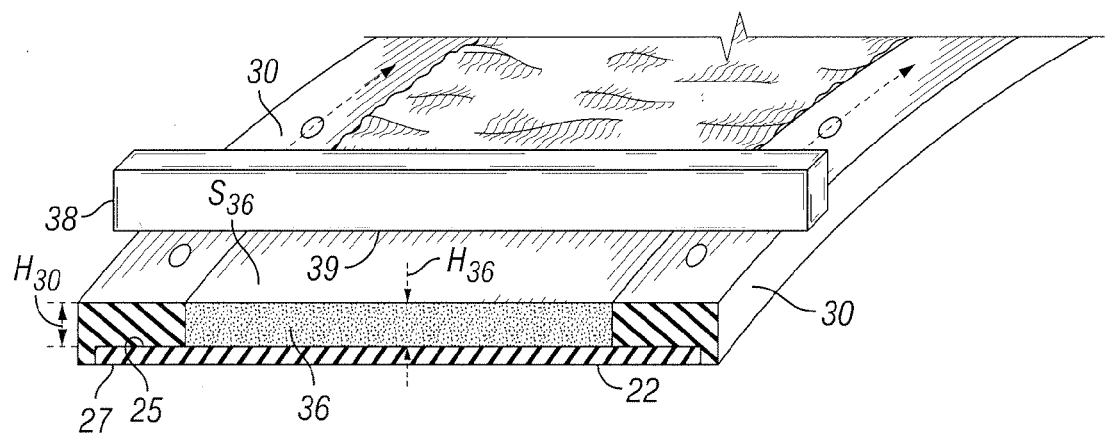
FIG. 5B is front perspective view of the base member of FIG. 5A showing a leveling member arranged laterally across the base member and atop the adhesive guide members to shape the adhesive material to a desired thickness along a length of the base member in accordance with a particular embodiment of the invention.

With reference to FIGS. 4-5B, various steps associated with the formation of an adhesive layer are shown for exemplary purposes. With reference to FIG. 4, an adhesive guide member 30 is shown arranged along a lateral side of a base member 22 prior to installation of a second adhesive guide member along an opposing lateral side of the base member. In FIGS. 5A and 5B, a pair of laterally opposing adhesive guide members 30 is shown. More specifically, with reference to FIGS. 4 and 5A, the adhesive guide members 30 are arranged along the bonding surface 25 to define an adhesive-receiving area 26 having a width $W_{26}$ extending between the guide members 30. Guide members 30 are shown to extend within a width $W_{22}$ of the base member, but may be arranged adjacent the lateral edges in other variations. Adhesive guide members 30 are also shown to extend a height $H_{30}$ above the base member 22 to a top of the guide member. For example, in particular embodiments, height $H_{30}$ is approximately equal to 8.9 millimeters. It is shown in FIG. 4, however, that the overall height of an adhesive guide member 30 may be greater than the height $H_{30}$ above which the guide member extends above the bonding surface 22. In the embodiment shown, adhesive guide member 30 includes a lower extension 32 to assist in aligning the adhesive guide member along the base member 22. It is understood that any known means for fixing the adhesive guide members relative to a base member may be employed. For example, apertures 34 are provided for alignment with apertures 28 within the base member as a means of affixing the adhesive guide members 30 to the base member 22 using fasteners or the like. By further example, guide members are clamped to the base member or any structure to which base member is fixed.

With reference to FIG. 5A, adhesive 36 is shown arranged along the bonding surface of the base member to form an adhesive layer of a desired thickness, where such thickness is equal to or greater than height $H_{30}$. The adhesive layer 36 is formed to have any desired width $W_{36}$. In the embodiment shown, the adhesive layer width $W_{36}$ is equal to a width $W_{26}$ of the adhesive-receiving area 26. In FIG. 5B, a leveling member 38 is shown extending laterally atop the pair of adhesive guide members 30 and translating along the length of the guide members and/or the bonding surface to form an adhesive layer of a desired thickness. A leveling surface or edge 39 of the leveling member 38 engages the adhesive to form an adhesive layer having a thickness $H_{36}$. The leveling surface or edge 39 is shown to be elevationally aligned with the top of each adhesive guide member 30, such that the adhesive layer thickness $H_{36}$ is generally equal to the height $H_{30}$ by which the adhesive guide members 30 extend above the bonding surface 22. Still, leveling surface or edge 39 may extend below the top of each adhesive guide member, such as when the adhesive layer thickness $H_{36}$ is less height $H_{30}$. In exemplary embodiments, the adhesive layer thickness $H_{36}$ is approximately equal to 8.9 mm.

Figure 10:
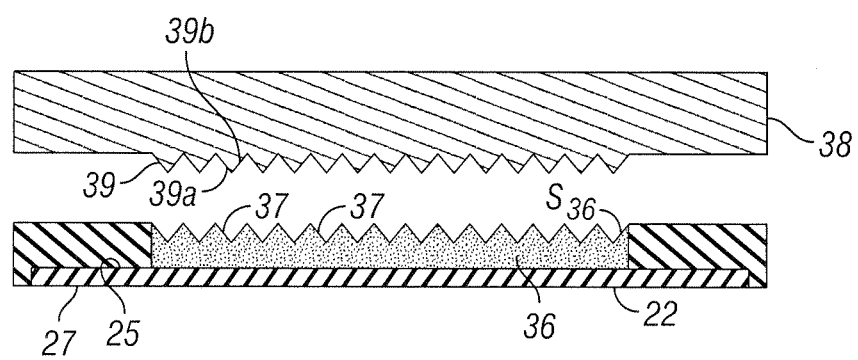
FIG. 10 is an end view of a leveling surface or edge shown in association with an adhesive layer, the leveling surface or edge having a plurality of recesses and extensions for forming recesses within a top, exposed surface of the adhesive layer in accordance with a particular embodiment of the invention.
Figure 11:
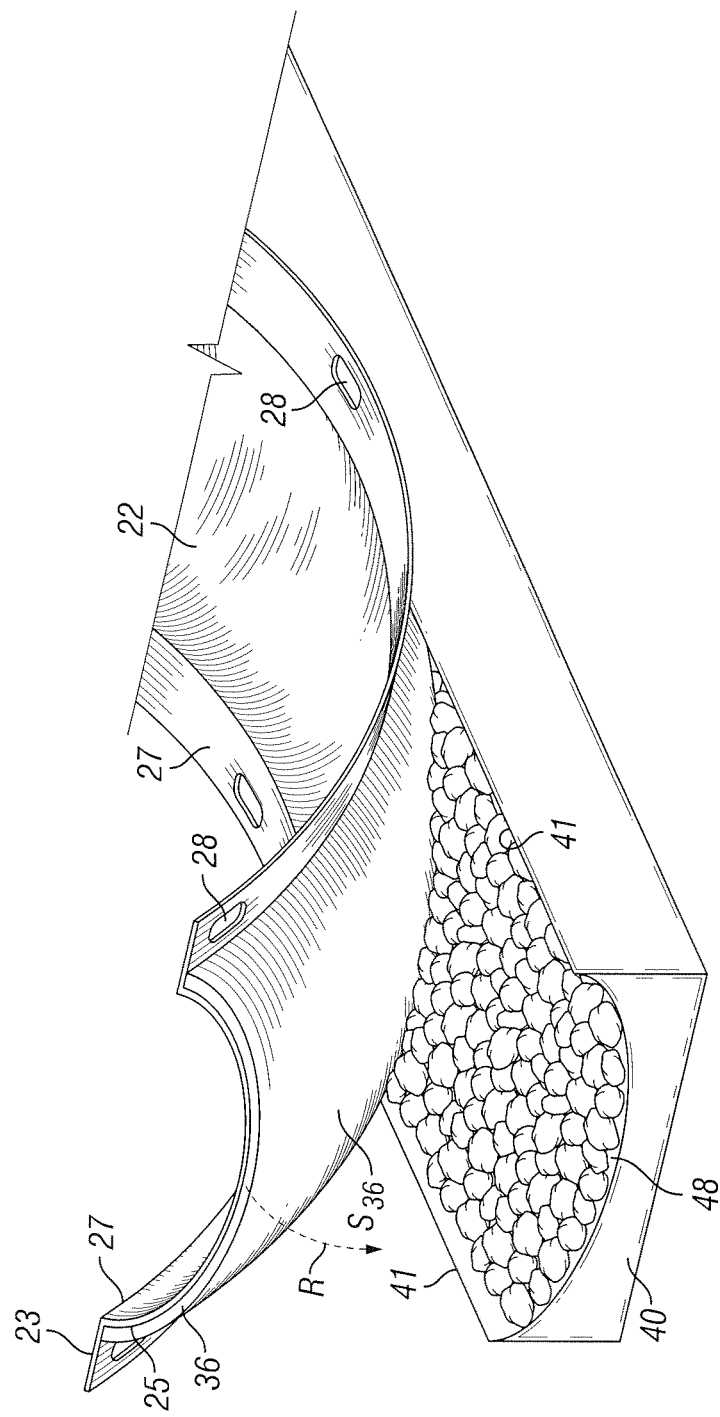
FIG. 11 is a top perspective view of a coated base member being rotated along a single layer of aggregate arranged along a retention surface, the bonding surface of the base member and the adhesive layer being both laterally convex and longitudinally convex and the single layer of aggregate and the retention surface being laterally concave in accordance with a particular embodiment of the invention.

As discussed above, the leveling surface or edge 39 may extend longitudinally along any desired path, which maybe linear or non-linear. With reference to FIG. 5B, the path is linear. By further example, an arcuate, concave non-linear path may be employed to form a laterally convex adhesive layer, such as is shown in FIG. 11. Non-linear paths may also comprise non-arcuate paths, such as to provide a plurality of recesses and extensions for forming an adhesive layer having corresponding recesses arranged along a top, exposed surface of the adhesive layer. For example, with reference to FIG. 10, the leveling surface or edge 39 of a leveling member is shown in association with an adhesive layer 36. The adhesive layer 36 includes a top, exposed surface $S_{36}$ having recesses 37 corresponding to the profile or shape of the leveling surface or edge. In the embodiment shown, the non-linear leveling surface or edge 39 includes a plurality of recesses 39a and extensions 39b. As leveling surface or edge 39 translates relative the adhesive layer 36, recesses 37 form grooves in the top, exposed adhesive layer surface $S_{36}$.

Figure 9:
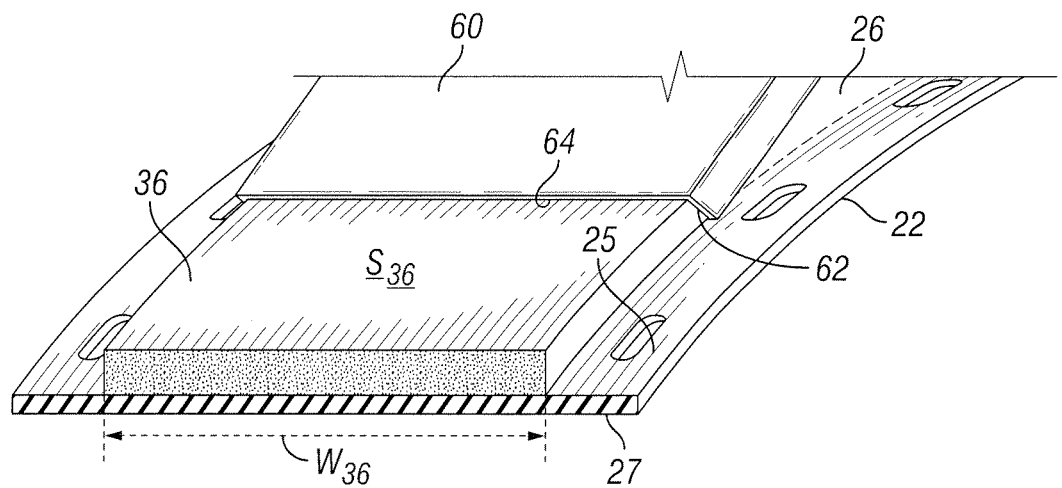
FIG. 9 is a top perspective view of an extruder forming an adhesive layer upon a bonding surface in accordance with a particular embodiment of the invention.

As more generally discussed above, the adhesive layer may be formed using an extrusion process. Accordingly, particular embodiments of the step of applying adhesive material of a pre-determined thickness along the longitudinally convex bonding surface comprise extruding adhesive material along a length of the bonding surface. Any known extrusion process may be employed, whereby the extruder translates relative to bonding surface to discharge an adhesive layer along a length of the bonding surface. For example, with reference to FIG. 9, an extruder 60 is shown applying a layer of adhesive 36 to a bonding surface 25. Specifically, adhesive is being discharged from a discharge aperture 62. The discharge aperture is sized and shaped to form an adhesive layer having any desired thickness or shape. For example, discharge aperture may be shaped to achieve a constant thickness adhesive layer as exemplarily shown, or an adhesive layer having a variable thickness. Accordingly, discharge aperture may be shaped to form a laterally convex adhesive layer as discussed herein. Further, extruder discharge aperture may include a surface or edge corresponding to any leveling surface or edge contemplated herein. For example, with reference again to FIG. 9, extruder discharge aperture 62 may include a top leveling surface or edge 64 comprising any desired linear or non-linear surface or edge contemplated for leveling member surface or edge 39, such as for forming an adhesive layer having a textures top, exposed surface $S_{36}$ as exemplarily shown in FIG. 10.

Particular embodiments of such methods may further include the step of arranging a single layer of aggregate material (also referred to herein as the "aggregate layer") along a retention surface. Aggregate material, or more simply "aggregate," may comprise a plurality of any material used to form a real-world tire operating surface, or any other material resembling such material. For example, aggregate (also referred to as "constituent") may comprise stones, rocks, or pebbles, brick or any other component that may be arranged or assembled to form, or represent, a real-world tire operating surface. In particular embodiments, aggregate is larger than sand, silica, or any other particulate or granular material used to form an abrasive, non-slip surface, such as those that are presently used on road wheels.

A single layer of aggregate material means that the aggregate is assembled in a single layer, whereby a thickness of such layer does not include any stacked or overlapping aggregates or any significantly overlapping aggregates. Overlapping aggregates that are not significantly overlapping aggregates overlap less than 50% in particular embodiments, and, in other embodiments, 25% or less or 10% or less. As such, the aggregate layer has a first side that rests upon and engages the retention surface, and a second side opposite the first side that is exposed. Because the aggregate may have many facets or faces, depending on its shape, each of the first and second sides may comprise one or more facets or faces of the aggregate. Because the adhesive material of the coated bonding surface will be subsequently arranged to engage the exposed second side of the single layer of aggregate, the second side will bond with the adhesive material while the first side will form the tire operating surface of the road wheel. This single layer of aggregate material facilitates retention of a full thickness of the aggregate layer onto the adhesive layer of the coated bonding surface. Otherwise, if the aggregate layer included stacked aggregate or significantly overlapping aggregates, the aggregate arranged under a stacked aggregate may not engage the adhesive layer upon its engagement with the aggregate layer in subsequent steps. As a result, the underlying aggregate will not be transferred to the coated bonding surface and an undesired recess corresponding to the non-transferred aggregate will be arranged within the final tire bonding surface.

As suggested above, aggregate may be arranged in any desired arrangement on the retention surface knowing that the arrangement of aggregate will be ultimately transposed or transferred onto the layer of adhesive material without significant alteration. For example, the aggregate may be closely arranged to provide a tire operating surface substantially covered with aggregate. The aggregate may be manually arranged to improve the control and the accuracy of the aggregate arrangement, and to facilitate specific or custom aggregate arrangements. For example, manual arrangement includes selecting sufficiently sized aggregates and selectively arranging the aggregates to form a tire operating surface having a desired texture. Manual arrangement may also better facilitate forming a single layer of aggregates and/or forming a single layer of aggregates having a more uniform thickness (that is, forming a layer comprised of aggregates having similar thicknesses or heights). By further example, manual arrangement allows the aggregate to be arranged in a more or less dense arrangement. This is because aggregate, such as stone or rock, may not be uniform, and manual arrangement facilitates a more thoughtful arrangement between adjacent aggregate. Manual arrangement also facilitates individual arrangement of each aggregate regardless of its arrangement relative other aggregate. For example, it may be desired to arrange each aggregate such that any sharp edges are not located along the tire operating surface, and instead are arranged along the second side of the single layer of aggregates for ultimate engagement with the adhesive material of the coated bonding surface. By further example, sides of aggregates having larger surface areas may be arranged along the second side of the aggregate layer to provide larger bonding surfaces for improved bonding with the adhesive material.

To facilitate arrangement of the aggregate layer and its application to the longitudinally convex adhesive layer, aggregate is arranged on a separate retention surface. The retention surface may comprise any desired surface. In particular embodiments, the retention surface is a flat or planar surface. However, it is understood that a non-flat or contoured surface may be employed. Such contoured surface may extend longitudinally in a lengthwise direction and/or laterally in a widthwise direction along any non-linear path. For example, a non-linear path may form a contoured surface defined by a constant radius of curvature. By further example, when extending laterally in a non-linear path, the retention surface may extend laterally along an arcuate path to define a laterally concave surface for applying aggregate along a laterally convex adhesive layer. The retention surface may be texturized to better retain the aggregates in desired positions. This may be more useful when the retention surface is not planar or flat, such as when the retention surface is laterally or longitudinally concave or convex. In particular embodiments, aggregate is arranged within an area along a retention surface having a length and width at least approximately equal to a length and a width of the adhesive layer. Accordingly, the aggregate may substantially cover the adhesive layer, although it is understood that in other variations portions of the adhesive layer may remain uncovered by the aggregate.

To control the arrangement of aggregate along the retention surface, particular embodiments of arranging a single layer of aggregate material along a retention surface includes first arranging a pair of aggregate guide members on opposing lateral sides of a width of the arranged aggregate. The aggregate guide members are arranged to extend a desired height above or outwardly from the retention surface. For example, in particular embodiments, this height is equal to or greater than a desired thickness of the aggregate layer. Accordingly, aggregates may be arranged between the pair of aggregate guide members to the top of the aggregate guide members or to a particular distance below the top of the aggregate guide members. It is understood that the aggregates may be arranged to extend the entire width, or a portion of the width, between laterally opposing aggregate guide members. Further, an aggregate leveling member may be arranged to extend laterally across the retention surface and atop the aggregate guide members to ensure that the aggregates only extend a desired height above the retention surface. Therefore, if the bottom of the aggregate leveling member contacts any aggregate arranged along the retention surface, the aggregate is too high and either needs to be rearranged or replaced to not contact the bottom of the aggregate leveling member. In embodiments where the retention surface is laterally concave, the aggregate leveling member may have a convex bottom side or edge to control the height of the aggregate layer, and configured to translate along appropriately sized and shaped aggregate guide members. It is understood that the aggregate guide members may be affixed to or otherwise fixed relative the retention surface or may form a portion or edge of the retention surface itself.

It follows that when employing aggregate guide members, more than one pair may be employed as discussed in association with the adhesive guide members. Accordingly, one or more aggregate guide members may be arranged on each opposing lateral side of an aggregate-receiving area along the retention surface. And as further discussed in association with the adhesive guide members, aggregate guide members arranged on either lateral side may be arranged continuously or discontinuously along the aggregate-receiving area. Nevertheless, the aggregate guide members are fixed relative to the retention surface. For example, the aggregate guide members are attached to the retention surface, to a structure to which the retention surface is formed or attached, or to any other structure fixed relative to the retention surface. It is understood that the retention surface may comprise any surface associated with any structure. For example, retention surface may comprise be associated with a sheet of material, a tray, or a floor or ground surface.

Figure 6:
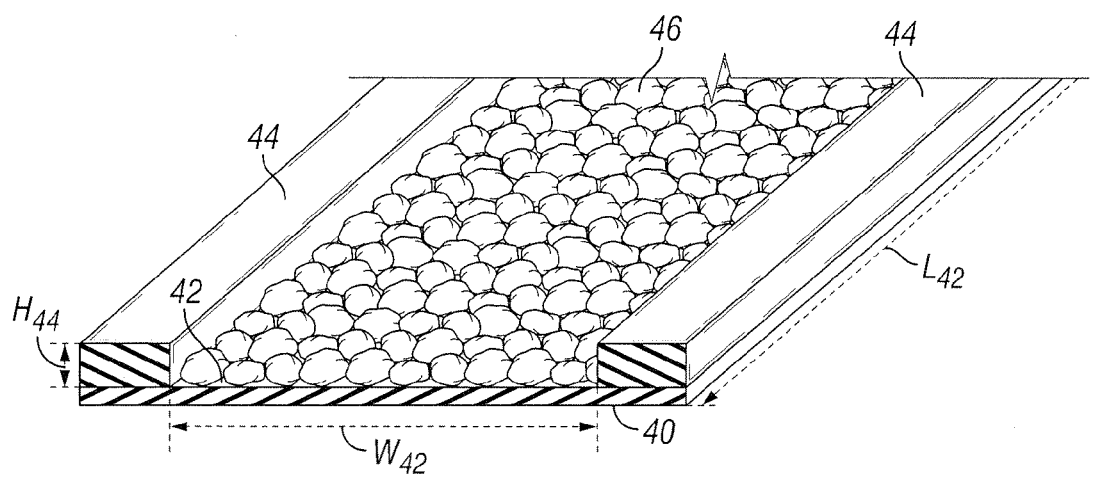
FIG. 6 is a front perspective view of an aggregate application fixture comprising a generally planar base and a pair of aggregate guide members having a pre-determined thickness or height, the aggregate being arranged to form a single layer of aggregate along the planar base between the pair of adhesive guide members in accordance with a particular embodiment of the invention.
Figure 7A:
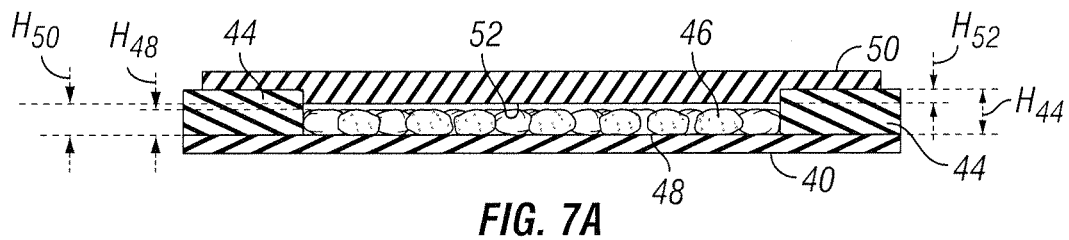
FIG. 7A is an end elevational view showing an aggregate leveling member arranged laterally across the retention surface and atop the aggregate guides fixture of FIG. 6 in accordance with a particular embodiment of the invention.

With reference to FIGS. 6 and 7A, steps of such methods of applying aggregate material are shown in accordance with particular embodiments. As can be seen, aggregate guide members 44 are arranged atop a retention surface 40 to define an aggregate-receiving area 42 having a width $W_{42}$. Retention surface 40 is formed along a retention base formed of any desired material. For example, the retention base may comprise a sheet formed of metal or metal alloy material, wood, concrete, or plastic. Aggregate 46 is shown arranged atop the retention surface to form a single layer 48 of aggregate, which is more clearly shown in FIG. 7A. The aggregates 46 comprise stones, pebbles, rocks, brick or any other component that may be arranged to form a real-world tire operating surface. In particular embodiments, aggregates 46 are larger than sand, silica, or other abrasive particulate or granular material used to form an abrasive, non-slip texturized surface that may have been applied to prior road wheels. For example, in particular embodiments, aggregates 46 have a height, width, and/or depth at least equal to 6 mm, and more specific embodiments, a height, width, and/or depth at least equal to 3 mm or 6 mm to 10 mm. It is understood that aggregates having a height, width, and/or depth at least equal to 10 mm or more may also be employed. Desired sized aggregate may be selected by any desired means, which includes using a screen to separate differently sized aggregate.

With reference to FIG. 7A, the aggregate guide members 44 extend a height $H_{44}$ above the retention surface 40. For example, in particular embodiments, height $H_{44}$ is approximately equal to 12 millimeters. The aggregate layer 48 formed extends a height $H_{48}$ above the retention surface 40 but below the height $H_{44}$ by which the aggregate guide members 44 extend above the retention surface. FIG. 7A also shows an aggregate leveling member 50 extending laterally across the retention surface and atop the aggregate guide members 44 to ensure that the aggregates only extend the desired height above the retention surface. The aggregate leveling member 50 has a bottom surface or edge 52 that determines whether any of the aggregates extend beyond a desired height $H_{50}$ above the retention surface. While the bottom surface or edge 52 may be elevationally level with the top of each guide member (in similar fashion to the adhesive leveling member 38 shown in FIG. 5B), the bottom surface or edge 52 may extend a height $H_{52}$ downward from each aggregate guide member 44 as desired to achieve height $H_{50}$ (just as the edge 39 of leveling member 38 may also extend down from each adhesive guide member). In operation, aggregate guide member 50 may be translated longitudinally along the aggregate guides 44 to ensure that all the aggregate is properly sized and arranged along the retention surface as desired. It is understood that the bottom surface or edge 50 may extend linearly, such as is shown in FIG. 7A, or non-linearly, such as arcuately when forming a longitudinally convex adhesive layer.

Particular embodiments of such methods include the step of placing a width of the longitudinally convex layer of adhesive material of the coated bonding surface into engagement with the single layer of aggregate. To achieve the intended engagement, the coated bonding surface is arranged relative the single layer of aggregates such that a width of the longitudinally convex adhesive layer engages the layer of aggregates. Because the adhesive layer is longitudinally convex, a portion of the adhesive layer will remain disengaged from the aggregate layer while another portion along a length of the adhesive layer is engaged with the aggregate layer, such as when the aggregate layer is not longitudinally convex or not similarly convex longitudinally. In such instances, not until the coated bonding surface is rotated in a subsequent step will a length of adhesive layer engage the aggregate layer.

To control the engagement of the adhesive layer with the aggregate layer, the bonding surface is separated from, or spaced apart from, the retention surface. Because the layer of aggregate is arranged between the retention surface and the bonding surface, the bonding surface is separated from the retention surface by a distance (also referred to as an "offset distance") equal to or greater than a height of the aggregate layer. The offset distance may be achieved by any known means.

For example, an offset distance between the bonding surface and the retention surface is achieved when one or more surfaces fixed relative the adhesive layer engage one or more surfaces fixed relative the aggregate layer, where one or more surfaces associated with either the adhesive layer and/or the aggregate layer extend to a location arranged between such layers to establish the offset distance. For example, the offset distance may be achieved by employing at least one pair of spacers, whereby one spacer is laterally spaced from the other spacer on opposing sides of the aggregate layer or the adhesive layer. To achieve the offset distance, at least a portion of one pair of spacers is arranged to extend a distance between the bonding surface and the retention surface that is equal to the offset distance.

It is understood that the offset distance may be equal to a portion of a spacer height or thickness, or may be equal to the sum of two or more stacked spacer heights or thicknesses. For example, a pair of spacers may be fixed relative the retention surface while a second pair of spacers is fixed relative the bonding layer. Accordingly, any pair of spacers may be attached to any structure fixed relative to the retention surface or any structure fixed relative the bonding surface. For example, when attached to any structure fixed relative to the retention surface, the pair of spacers may comprise the pair of aggregate guide members. By further example, when attached to any structure fixed relative to the bonding surface, the pair of spacers may comprise the pair of adhesive guide members.

When employing spacers, engaging the adhesive layer with the aggregate layer includes applying a sufficient force such that laterally spaced spacers sufficiently engage a corresponding surface or structure to achieve the desired offset distance between the bonding surface and the retention surface. By properly contacting the spacers, the resultant radius of the tire operating surface is correctly obtained as the bonding surface rotates along the spacers to apply the aggregate along a length of the adhesive layer.

Figure 7B:
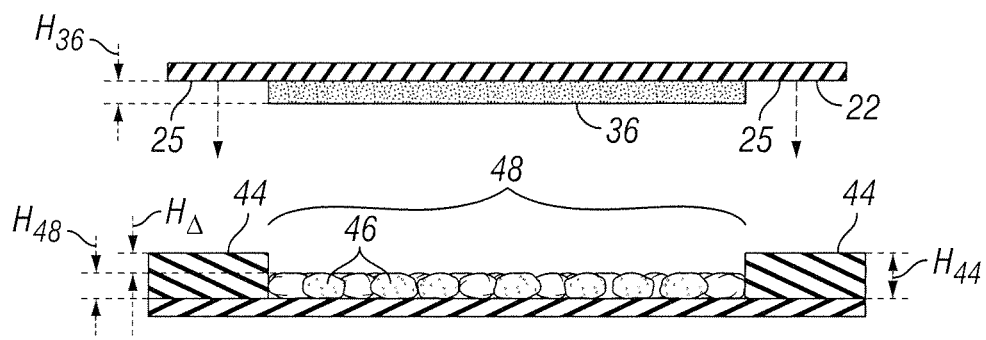
FIG. 7B is an end elevational view showing the adhesive coated base member being applied to the fixture of FIG. 6 in accordance with a particular embodiment of the invention.
Figure 7C:
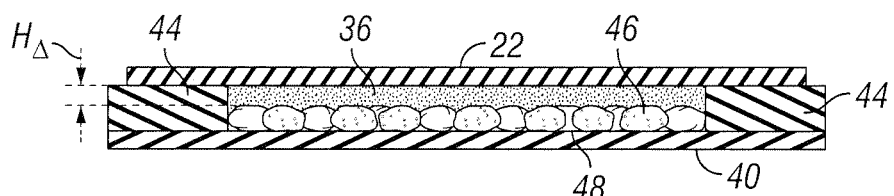
FIG. 7C is an end elevational view showing the adhesive coated base member of FIG. 7B applied to the aggregate application fixture in accordance with a particular embodiment of the invention.

With reference to FIGS. 7B and 7C, exemplary embodiments of the step of placing a width of the longitudinally convex layer of adhesive material of the coated bonding surface into engagement with the single layer of aggregate are shown. In FIG. 7B, the coated bonding surface formed along a base member 22 is shown elevationally inverted as it approaches engagement with an aggregate layer 48. In FIG. 7C, the adhesive layer 36 of the coated bonding surface is fully engaged with the aggregate layer 48, such that laterally opposing longitudinally convex surfaces 25 of the base member 22 fixed relative the adhesive layer 36 engage the top surfaces of a laterally opposing pair of spacers comprising aggregate guide members 44 fixed relative to the aggregate layer 48 and to retention surface 40. In the embodiment shown, the adhesive layer is arranged within the height $H_A$ remaining between the aggregate layer 48 and the top of the aggregate guide members 44. To impart compressive forces upon the adhesive layer by the aggregate for the purpose of imparting the aggregates within the adhesive layer, the height $H_A$ remaining between the aggregate layer 48 and the top of the aggregate guide members 44 is less than the thickness $H_{36}$ of the adhesive layer. In particular exemplary embodiments, aggregate guide members 44 extend a height $H_{44}$ of approximately 12 mm above the retention surface with aggregates extending approximately 6 mm to 10 mm above the retention surface such that the height $H_A$ remaining between the aggregate layer 48 and the top of the aggregate guide members 44 is equal to approximately 2 mm to 6 mm. In such embodiments, the aggregates are applied to an adhesive layer having a thickness of approximately 8.9 mm.

Particular embodiments of such methods further includes the step of rotating the coated bonding surface in a lengthwise direction relative the retention surface until a length of the longitudinally convex layer of adhesive material has engaged the single layer of aggregate, whereby the engaged aggregate remains affixed to the adhesive layer subsequent rotation to effectively transfer the engaged aggregate from the retention surface to the coated bonding surface to coat the adhesive layer with aggregate. Once the coated bonding surface is arranged relative the single layer of aggregates such that a width of the longitudinally convex adhesive layer engages the layer of aggregates, the coated bonding surface is rotated relative the retention surface and aggregate arranged thereon for the purpose of transposing or transferring the aggregates from the retention surface and to the longitudinally convex adhesive layer. In other words, by rotating the longitudinally convex adhesive layer in a lengthwise direction along the aggregate, the aggregate is effectively rolled onto a length of the longitudinally convex adhesive layer. Because the aggregates are transferred to the longitudinally convex adhesive layer by relative rotation between the adhesive layer and the retention surface without translation, the arrangement of aggregates along the retention surface is able to remain generally intact as it is transferred to the adhesive layer. Relative rotation may be achieved by rotating any structure. For example, the adhesive layer with the bonding surface or base member may rotate while the retention surface with aggregate remains fixed, or vice versa. It is also understood that relative rotation may be achieved even when both the aggregate and the adhesive layer rotate, albeit at different rates.

In embodiments discussed above in association with the step of engaging the adhesive layer with the aggregate layer, where engagement between the adhesive layer and the aggregate layer is controlled when one or more surfaces fixed relative the adhesive layer engage one or more surfaces fixed relative the aggregate layer, such as a pair of spacers, for example, relative rotation is performed while these surfaces remain engaged. This is accomplished when one of the one or more surfaces fixed relative the adhesive layer are longitudinally convex. A non-slip surface or material may be arranged between the coated bonding surface and the structure upon which it rotates to resist any unintended translation or slippage there between. Actual performance of the rotation, however, may be performed by any known means of rotating. For example, rotation may be performed manually or automatically using a machine or mechanical system.

Figure 7D:
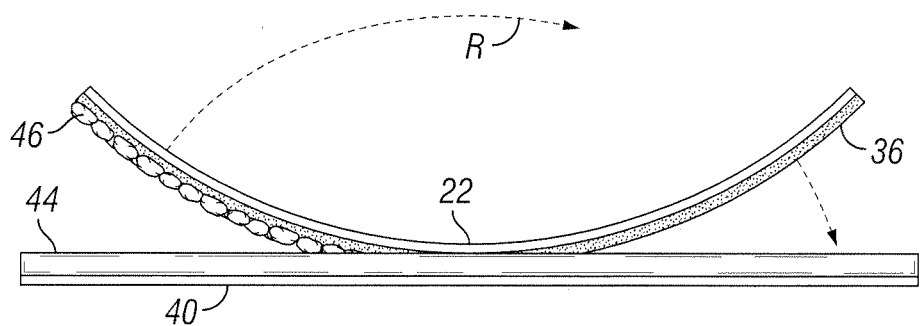
FIG. 7D is a side elevational view of the adhesive coated base member applied to the aggregate application fixture showing the base member being rotated along a length of the fixture in accordance with particular embodiments of the invention.
Figure 8:
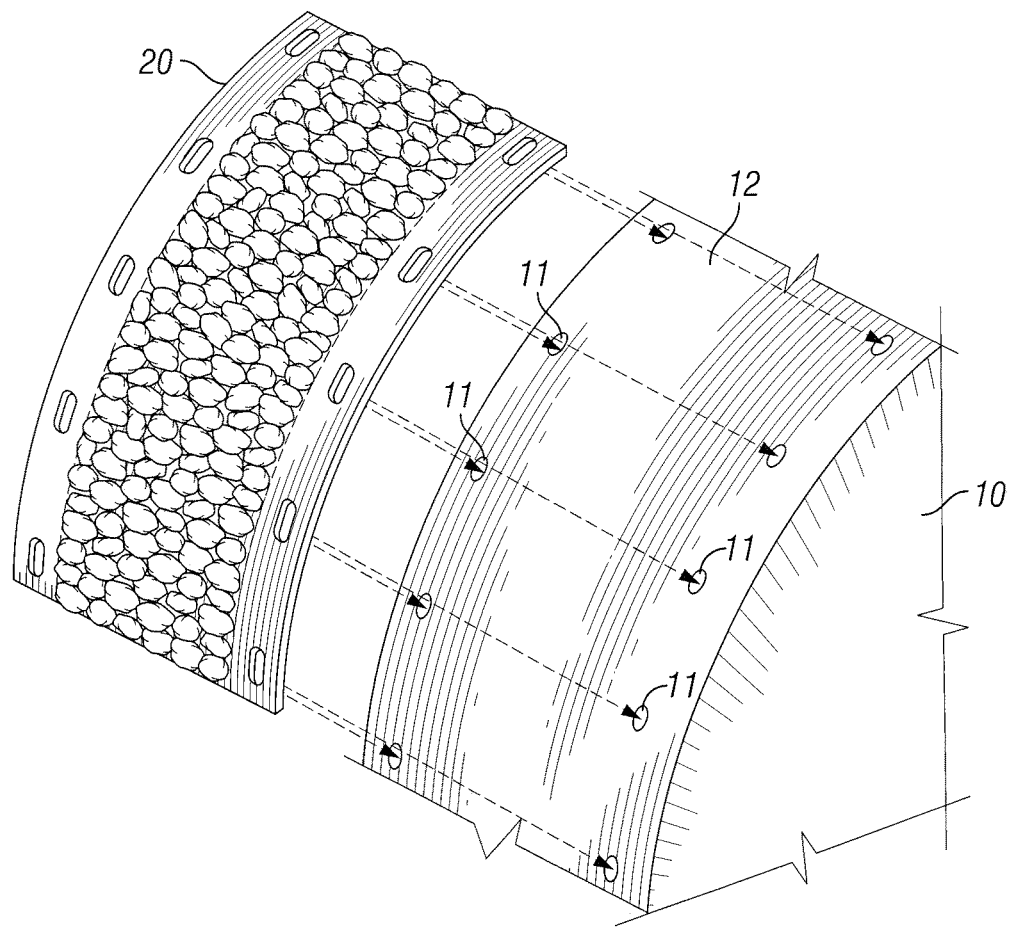
FIG. 8 is a top perspective view of an arcuate ring segment for forming the exterior tire operating surface of the road wheel in FIG. 1, the arcuate ring segment being formed in accordance with particular embodiments of the methods discussed herein.

With reference to FIG. 7D, exemplary embodiments of the step of rotating the coated bonding surface in a lengthwise direction relative the retention surface are shown. In particular, the coated bonding surface formed along a base member 22 of FIG. 7C is shown arranged atop the aggregate layer and a pair of spacers, the spacers comprising aggregate guide members 44, for example. The figure shows the longitudinally convex curvature of the adhesive layer 36 and the corresponding base member 22, and suggests rotating or rolling the adhesive layer lengthwise with the base member along a length of the aggregate layer and aggregate guide members 44 to achieve relative rotation and transfer of the aggregates to the adhesive layer 36 from the retention surface. Such rotation is designated with reference to R in the figure, in the direction associated with associated the corresponding arrows. A resulting tire operating surface section 20 is shown in FIG. 8 for application to a road wheel 10 of FIG. 1. The steps taken to form the tire operating surface section may be repeated until a sufficient quantity of such sections are prepared for installation and installed upon a road wheel to form an annular tire operation surface around the road wheel.

As discussed above, the road wheel may include a laterally convex tire operating surface. Accordingly, the methods discussed herein may be employed to form a tire operating surface that is both laterally and longitudinally convex. With reference to FIG. 11, for example, a base member 22 is shown being rotated along a single layer of aggregate 48 arranged along a retention surface 40. More specifically, the base member 22 includes a laterally and longitudinally convex bonding surface 25 and a laterally and longitudinally convex adhesive layer 36 arranged thereon. While bonding surface 25 is laterally convex, side portions of the base member 23 may extend laterally along a different path than that of the bonding surface, such as to facilitate attachment of the base member to a road wheel.

To facilitate application of the aggregate upon the adhesive layer, the single layer of aggregate 48 and the retention surface 40 are both laterally concave. To facilitate the arrangement of the adhesive upon the bonding surface, a leveling member having a laterally concave leveling surface or edge may be employed. The leveling member may translate along any appropriately shaped and sized adhesive guides as necessary to achieve the desired adhesive layer. In other variations, when using an extruder to apply the adhesive layer, the discharge aperture (which may form a portion of an extruder die) may extend laterally along an arcuate path to form the convex adhesive layer. It is understood that when arranging aggregate along the concave retention surface, an aggregate leveling member may still be employed when retention surface is concave (or convex or otherwise not flat or planar). Accordingly, just as the leveling surface or edge of the adhesive leveling member may conform as desired to achieve a desired adhesive layer, the leveling surface or edge of the aggregate leveling member may extend longitudinally in a lateral direction of the retention surface along any desired path. For example, the leveling surface or edge of the aggregate leveling member may be concave when the retention surface is concave to achieve a single layer of aggregate. The aggregate leveling members may translate along the side edges 41 of the retention surface, or may translate along aggregate guide members appropriately shaped and fixed relative the retention surface.

Particular embodiments of the invention include the steps of repeating the necessary prior steps at least once to form a plurality of tire operating surface segments, and installing the plurality of tire operating surface segments along an exterior radially outer side of the rotatable road wheel to form an annular tire operating surface along the radially outer side of the road wheel. In instances where the bonding surface forms a radially outer surface of a bonding member, and the tire operating surface of the road wheel comprises a plurality of tire operating surface segments, a plurality of tire operating surface segments are formed according to any of the prior steps of such methods. Once formed, the plurality of tire operating surface segments are affixed to the radially outer surface of the road wheel by any known means of securing the segments to the road wheel known to one of ordinary skill, such as those discussed above. It is understood that the terminal ends of each segment may be jagged or non-linear, such as when aggregate extends partially beyond the terminal end after being applied to the adhesive layer. Therefore, any aggregate arranged along the terminal end of a segment may be cut, trimmed, or ground prior to installing the segment along the road wheel to provide a desired terminal end. This may be performed manually using a hand tool or other machine, or may be performed using any automated process. The aggregate may also be rearranged or replaced prior to or after installation on the road wheel before the adhesive sets or cures. Further, upon installation, the terminal end may have locations where aggregate is not properly located along the adhesive (that is, voids may be present along the aggregate at or near the terminal end), and/or the aggregate located along adjacent terminal ends of adjacent segments may overlap or not otherwise mate as desired. To remedy any such scenario, aggregate may be added, rearranged, and/or replaced before the adhesive cures or, if cured, the adhesive with any aggregates may be removed and replaced in any desired arrangement. Post-cure removal may be performed using any known method, such as grinding or cutting.

While this invention has been described with reference to particular embodiments thereof, it shall be understood that such description is by way of illustration and not by way of limitation. Accordingly, the scope and content of the invention are to be defined by the terms of the appended claims.

What is claimed is:

1. A method of forming a tire operating surface for a road wheel, the method comprising the steps of:
   providing a longitudinally convex bonding surface for receiving a textured tire operating surface, the bonding surface being associated with a radially outer side of a rotatable road wheel and having a width and a convex length extending along an arcuate path;
   applying adhesive material of a pre-determined thickness along the longitudinally convex bonding surface to form a coated bonding surface comprising a longitudinally convex layer of adhesive material arranged along the bonding surface;
   arranging a single layer of aggregate material along a retention surface;
   placing a width of the longitudinally convex layer of adhesive material of the coated bonding surface into engagement with the single layer of aggregate; and,
   rotating the coated bonding surface in a lengthwise direction relative the retention surface until a length of the convex layer of adhesive material has engaged the single layer of aggregate, whereby the engaged aggregate remains affixed to the layer of adhesive material subsequent rotation to effectively transfer the engaged aggregate from the retention surface to the coated bonding surface to coat the layer of adhesive material with aggregate and thereby affixing the single layer of aggregate along the bonding surface to form a tire operating surface along the bonding surface.

2. The method of claim 1, where the step of applying adhesive material of a pre-determined thickness along the longitudinally convex bonding surface comprises:
   arranging a pair of adhesive guide members along a length of the bonding surface, the pair of adhesive guide members each having an arcuate length and being spaced apart laterally across a width of the bonding surface to provide an area for receiving the adhesive material; and,
   applying adhesive material between the pair of adhesive guide members to achieve a thickness at least equal to the pre-determined thickness.

3. The method of claim 2, where the step of applying adhesive material of a pre-determined thickness along the longitudinally convex bonding surface further comprises:
   arranging a leveling member laterally across the bonding surface and atop the pair of adhesive guide members; and,
   translating the leveling member in a lengthwise direction of the bonding surface atop the pair of adhesive guide members.

4. The method of claim 2, where the pre-determined thickness is equal to a height by which the pair of adhesive guide members extend from a base member upon which the pair of adhesive guide members are arranged.

5. The method of claim 1, where the step of applying adhesive material of a pre-determined thickness along the longitudinally convex bonding surface comprises extruding adhesive material along a length of the bonding surface.

6. The method of claim 1, where the longitudinally convex bonding surface comprises a radially outer surface of a base member, the base member having a thickness extending radially between a concave inner side and a longitudinally convex outer side such that the base member forms a tire operating surface segment when the layer of adhesive material is coated with aggregate.

7. The method of claim 6 further comprising the steps of:
   repeating the prior steps at least once to form a plurality of tire operating surface segments; and,
   installing the plurality of tire operating surface segments along an exterior radially outer side of the rotatable road wheel to form an annular tire operating surface along the radially outer side of the road wheel.

8. The method of claim 1, wherein the step of arranging a single layer of aggregate material is performed manually by selecting sufficiently sized aggregates and selectively arranging the aggregates to form a tire operating surface having a desired texture.

9. The method of claim 1, wherein the step of arranging a single layer of aggregate comprises arranging aggregate along a retention surface and within an area along a retention surface having a length and width at least approximately equal to a length and a width of the layer of adhesive material.

10. The method of claim 1 further comprising the step of:
    spacing apart laterally a pair of aggregate guide members across a width of the retention surface, whereby the step of arranging a single layer of aggregate material along a retention surface includes arranging the aggregate between the pair of aggregate guide members.

11. The method of claim 10, where during the step of placing a width of the longitudinally convex layer of adhesive material of the coated bonding surface into engagement with the single layer of aggregate and during the step rotating the coated bonding surface in a lengthwise direction relative to the retention surface, the pair of aggregate guide members extend between the retention surface and the bonding surface.

12. The method of claim 10, wherein the pair of aggregate guide members extend a height between a base member and the retention surface a distance greater than a height of the aggregate arranged along the retention surface.

13. The method of claim 10, wherein the pair of aggregate guide members are fixed relative the retention surface.

14. The method of claim 2, wherein the pair of adhesive guide members are removed from the bonding surface after applying the adhesive material and prior to arranging aggregate along the adhesive material.

15. The method of claim 14, where the step of arranging a single layer of aggregate material along a retention surface includes rearranging or replacing any aggregate that contacts the aggregate leveling member such that any rearranged or replaced aggregate is spaced from the aggregate leveling member.

16. The method of claim 10, where the step of arranging a single layer of aggregate material along a retention surface further comprises:
    arranging an aggregate leveling member laterally across the retention surface and atop the pair of aggregate guide members; and,
    translating the aggregate leveling member in a lengthwise direction of the retention surface above the aggregate material.

17. The method of claim 1, where the tire operating surface extending laterally along the width of the bonding surface is laterally convex.

18. The method of claim 1, where the step of applying adhesive material includes forming recesses along a top, exposed surface of the layer of adhesive material.

19. The method of claim 1, where a pair of spacers are arranged between the bonding surface and the retention surface during the steps of placing a width of the longitudinally convex layer of adhesive material of the coated bonding surface into engagement with the single layer of aggregate and rotating the coated bonding surface.

20. The method of claim 1, where a radius of curvature of the concave inner side of the base member is equal to a radius of curvature of the outer side of the road wheel or within 7% the radius of curvature of the outer side of the road wheel.

\* \* \* \* \*